US00RE34451E

United States Patent [19]

Donovan et al.

[11] E Patent Number: Re. 34,451

[45] Reissued Date of Patent: Nov. 23, 1993

[54] PERFORATING GUN WITH AUGER

[75] Inventors: Joseph F. Donovan, Houston, Tex.; Michael J. Naquin, Youngsville, La.

[73] Assignee: Baker Hughes Incorporated, Houston, Tex.

[21] Appl. No.: 949,735

[22] Filed: Sep. 23, 1992

Related U.S. Patent Documents

Reissue of:

[64] Patent No.: 5,076,355
Issued: Dec. 31, 1991
Appl. No.: 631,626
Filed: Dec. 21, 1990

[51] Int. Cl.[5] ..... E21B 43/116

[52] U.S. Cl. ..... 166/55.1; 166/242; 166/297

[58] Field of Search ..... 166/55, 55.1, 242, 297, 166/311; 175/4.52, 4.54, 4.51, 4.6

[56] References Cited

U.S. PATENT DOCUMENTS

| | | | |
|---|---|---|---|
| 1,080,684 | 12/1913 | Erickson . | |
| 2,336,586 | 12/1943 | Beckman et al. . | |
| 2,371,385 | 3/1945 | Eckel . | |
| 2,371,391 | 3/1945 | Haynes . | |
| 2,500,754 | 3/1950 | Huber | 166/55.1 X |
| 2,513,944 | 7/1950 | Kessler . | |
| 4,410,051 | 10/1983 | Daniel et al. | 166/55.1 X |
| 4,635,734 | 1/1987 | Donovan et al. | 175/4.6 |
| 4,681,163 | 7/1987 | Guidry et al. | 166/278 |
| 4,747,201 | 5/1988 | Donovan et al. | 29/433 |
| 4,830,120 | 5/1989 | Stout | 175/4.51 |
| 4,898,244 | 2/1990 | Schneider et al. | 166/55.1 X |
| 4,986,375 | 1/1991 | Maher | 175/323 |
| 4,995,456 | 2/1991 | Cornette et al. | 166/51 |
| 5,036,920 | 8/1991 | Cornette et al. | 166/278 |
| 5,040,619 | 8/1991 | Jordan et al. | 175/4.51 |

OTHER PUBLICATIONS

"Tubing-Conveyed Perforating Systems", Baker Sand Control Manual, pp. 1-26.

"Products, Services and Accessories", Baker Sand Control Manual, pp. 1-40.

*Primary Examiner*—Hoang C. Dang

*Attorney, Agent, or Firm*—Rosenblatt & Associates

[57] ABSTRACT

The invention features a perforating gun, with an external auger, which can be mounted to a tubing string. The auger facilitates removal of the gun after the sand is placed in the perforations. The perforating gun with external auger promotes the clean-up of the debris from the perforations after the gun is shot and facilitates the movement of the gun out of the sand. The sand can be spotted near the perforations without exposure to the formation of any kill fluids. The perforating gun with external auger need not be moved prior to admission of sand into the perforations. The assembly can be used so that preferred fluids, such as stimulating fluids, can be used to circulate the sand until the sand has been spotted adjacent the formation, whereupon the stimulating fluid is squeezed into the formation, leaving the sand in the perforations. The amount of fluid displaced into the formation is minimized and the selection of fluid helps to stimulate the subsequent flow during production.

30 Claims, 4 Drawing Sheets

PERFORATING GUN WITH AUGER

Matter enclosed in heavy brackets [ ] appears in the original patent but forms no part of this reissue specification; matter printed in italics indicates the additions made by reissue.

FIELD OF THE INVENTION

The invention relates to the field of perforating guns useful in penetrating formations in subterranean wells; specifically, in wells where the perforated formation requires treatment, commonly referred to as gravel packing.

BACKGROUND OF THE INVENTION

Subsequent to drilling or workover of a subterranean oil or gas well, it is sometimes desirable to gravel pack same in order to prevent solid particulate matter in consolidated production formations from being co-produced with the fluid hydrocarbons through the production conduit to the top of the well. In such operations, a "pre-pack" well screen may be utilized, along or in conjuction with exterior conventional gravel-packing techniques. In many instances, such gravel packing is performed without use of a "pre-pack" well screen and gravel is circulated in a viscous carrier fluid for deposition around the exterior of the well screen, which is positioned across the production zone. The deposited gravel prevents the solid particulate matter within the fluid hydrocarbons to freely pass therethrough, and the screen prevents the solids forming the gravel pack from entering into the interior of the production conduit, yet permits the fluid hydrocarbons to pass through porous openings therethrough.

In some instances, the gravel packing of a subterranean well is performed by depositing solid particulate matter, i.e., sand, within a highly viscous carrier fluid. This fluid body is introduced through a tubular conduit and placed within the bore across the production zone to straddle the open perforations. Thereafter, the tubing is withdrawn from the well, and the appropriate screen assembly, which may or may no include a "pre-pack" screen, is run into the well and inserted into the viscous body of fluid containing the gravel.

Since many of the carrier fluids are a highly viscous, high molecular weight, polymeric substance, they are typically shear-thinning, thixotropic substances. Typical of such materials is a product marketed by the Kelco Corporation under the name "XC Polymer," which is a bacterial fermentation product of a polysaccharide exposed to the bacteria xanthomonas campestris. When such fluid is agitated, its viscosity is reduced. However, when agitation is decreased, or stopped, the rheological property of the material is reversed and it becomes thixotropic, and the viscosity of the fluid increases substantially to permit the fluid to hold in suspension the solid particulate matter.

Due to the high viscosity and thixotropic nature of such fluids, insertion of the well "pre-pack" or other screen through the fluid will be resisted, often causing more torque and/or weight to have to applied through the length of the drillstring. Additionally, the thixotropic properties of such fluid also contribute substantially to the difficulties in removing any such screen assemblies, thus often requiring considerable more torque to be applied through the tubing.

Such high viscous and thixotropic fluids many times are utilized as completion or "kill" fluids to be placed across the production zone prior to or subsequent to the perforating of the casing. In such instances, it becomes considerably more difficult to insert the gun through such viscous completion fluids or to easily withdraw same from the fluid subsequent to the perforating step.

The present sequence that is employed involves perforation of the formation using a gun mounted to the end of a tubing string below a retrievable packer. After perforating the formation and allowing the well to flow to clean up the perforations, the packer is released and the well is killed by bullheading or pumping down the tubing into the formation or by reverse circulating down the annulus and up the tubing of kill fluids of sufficient density to keep the well from coming in as the tubing, including the retrievable packer, and the perforating gun are withdrawn completely out of the well. After removing the perforating gun, the tubing is reinserted into the well to facilitate the introduction of sand as part of the gravel-packing procedure. An alternative to removing the perforating gun completely out of the well requires pulling up the perforating gun, after it is fired, sufficiently above the perforations so that when sand is delivered down the tubing, the packed sand column will not reach the position of the raised-up perforating gun. In order to raise the perforating gun, the retrievable packer has to be released, which again requires the initial killing the well by bullheading or reverse circulating as previously described. The introduction of the killing fluids to the newly perforated formation has a negative effect on the productivity of the formation through the perforations. In employing the methodology of raising the gun above the perforation or coming completely out of the hole with the gun prior to the introduction of sand, the formation is exposed to a larger volume of "kill fluids," as well as a portion of the volume in the tubing string which is displaced during the deposition of sand ("squeezing") into the perforations.

As a means of getting around pulling the gun completely out of the hole or pulling it up sufficiently high above the perforations, another alternative would be to leave the gun in place. The problem with past designs of guns has been that the placement of sand with the gun in place adjacent the perforations can result in sticking of the gun at the bottom of the hole as the sand packs around the gun.

Another concern is how well the perforations clean up after the gun is fired. With past designs, the flow velocities in the region where the gun is mounted have been sufficiently slow to prevent comprehensive elimination of debris when the formation starts to flow after the perforating gun is fired.

The apparatus of the present invention addresses some of these disadvantages discussed above. The placement of the auger blade on the gun allows clean-up by initial flowing of the well with the formation isolated. The reversing out using kill fluids which is carried on thereafter occurs above the packer without any effect on the newly created perforations. Thereafter, without releasing the packer or moving the gun, the appropriate charge of sand can be spotted via circulation, again with the formation isolated. When the sand is properly spotted, it can then be directed through a ported disc located between the packer and the perforating gun into the newly created perforations caused by firing of the gun. This mechanism allows the placement of sand in the formation with a specifically selected carrier fluid as opposed to commonly used killing compounds. For example, a stimulating fluid can be used to spot the sand such that when the sand is properly spotted, the amount of liquid bullheaded into the formation to place the sand in the perforations can be a limited quantity of the most beneficial fluid to promote efficient flow of hydrocarbons from the formation through the newly made perforations created by shooting off the gun.

The suger blade around the perforating gun, which straddles the openings in the perforating gun so as not to be damaged by shooting off the gun, creates several advantages. After the formation is perforated and begins to flow, the flights of the auger create a tortuous path, thereby increasing the velocity of the gases and/or liquids produced from the formation. This increased velocity promotes the removal of the debris generated from firing the gun. Additionally, the positioning of the auger blades on the outside of the perforating gun facilitates the removal of the gun, even after the sand is pumped into the perforations. The string can be merely lifted and/or simultaneously rotated and the addition of the flights allows the gun to avoid getting stuck in the compacted sand at the newly packed perforations. In essence, the only resistive force against removing the gun from the sand is the weight of the sand accumulated between the flights of the auger. To the extent necessary, a rotational force can be applied to the gun to facilitate its removal in case of sticking. In the preferred embodiment, the auger is disposed in a manner such that rotation of the drillstring to tighten up its components results in a counter-rotation of the flights of the auger to assist in breaking loose from any obstruction as the gun is removed from the sand. The auger can be left or right handed without departing from the spirit of the invention.

Auger have previously been applied to screens, as illustrated in U.S. Pat. Nos. 2,513,944; 1,080,684; and 2,371,391. Also cited as relevant to the general field of tubing-conveyed perforating and sand control are U.S. Pat. Nos. 4,681,163, 2,336,586; and manuals put out by Baker Sand Control, a Baker Hughes company, regarding perforating systems, entitled "Tubing-Conveyed Perforating Systems," as well as manual on gravel-packed systems put out by Baker Sand Control, entitled "Products, Services and Accessories."

SUMMARY OF THE INVENTION

The invention features a perforating gun, with an external auger, which can be mounted to a tubing string. The auger facilitates removal of the gun after the sand is placed in the perforations. The perforating gun with external auger promotes the clean-up of the debris from the perforations after the gun is shot and facilitates the movement of the gun out of the sand. The sand can be spotted near the perforations without exposure to the formation of any kill fluids. The perforating gun with external auger need not be moved prior to admission of sand into the perforations. The assembly can be used so that preferred fluids, such as stimulating fluids, can be used to circulate the sand until the sand has been spotted adjacent the formation, whereupon the stimulating fluid is squeezed into the formation, leaving the sand in the perforations. The amount of fluid displaced into the formation is minimized and the selection of fluid helps to stimulate the subsequent flow during production.

DETAILED DESCRIPTION OF THE PREFERRED EMBODIMENT

Figure 1:
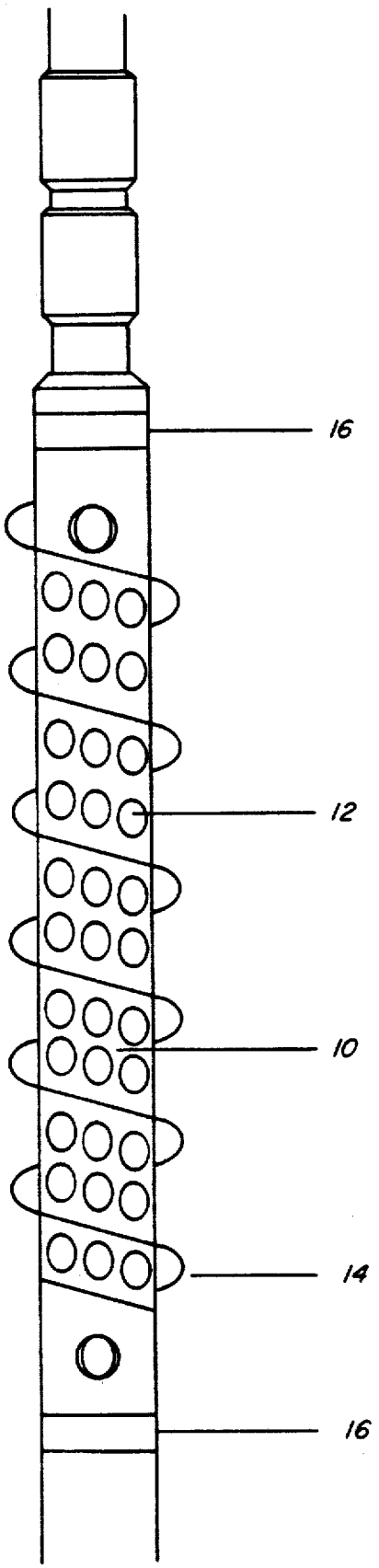
FIG. 1 is a schematic representation of the perforating gun, showing the auger on the outside of the perforating gun.

The apparatus A of the present invention is shown in FIG. 1. The perforating gun is generally referred to as 10. Perforating gun 10 can be of various lengths and is generally assembled in sections to the desired length. On the outer surface of perforating gun 10 are a plurality of ports 12 through which the explosive charge exits and perforates the formation. As seen in FIG. 1, the ports are generally arranged in a helical pattern around the periphery of perforating gun 10, and auger 14 is shown on the outer periphery of perforating gun 10. While the auger 14 is schematically represented as being continuous, it may have periodic discontinuities if perforating gun 10 is assembled from a plurality of joints to obtain the desired length. There may be a slight gap which is preferably less than 12 inches. The pitch is preferably 4–8 inches.

While the schematic representation of FIG. 1 shows the auger 14 connected directly to the outer surface of the perforating gun 10, it is also within the purview of the invention to take the auger 14, which has a general helical pattern, and mount it to a mandrel or hollow core which can slip over the periphery of perforating gun 10 and be fitted up so that the openings 12 not only align with openings on the core but also fall between the flights to avoid damage to the auger 14 when the gun 10 is fired. In the latter configuration, the auger 14, mounted on a core which is basically a tube that overlays the perforating gun 10, is connected to perforating gun 10 by fasteners which extend through the mandrel into receptacles 16 mounted to perforating gun 10. The auger 14 should be noted as being lefthand. The normal direction of rotation of the rotary table is righthand, which results in the tightening up of all the joints in the tubing string above perforating gun 10. The advantage of making auger 14 with a lefthand thread is that it facilitates removal of the gun 10 from the compacted sand in the event any obstruction is encountered. The turning of the rotary table, which in turn acts to tighten all the joints, drives the auger 14 in the opposite direction to promote loosening of the gun 10, which may stick in the compacted sand.

The auger 14 extends beyond the perforations. In the preferred embodiment, the length of the auger above the perforation should be approximately equal to the length of the auger in the perforated zone.

Figure 2:
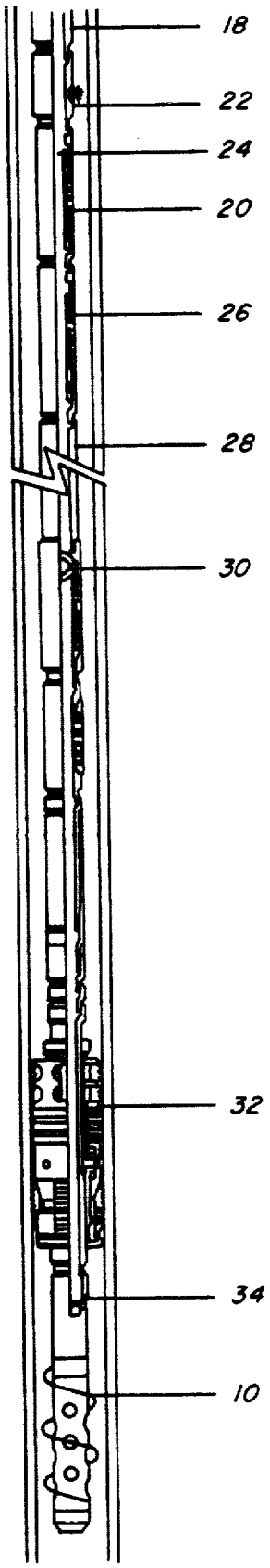
FIG. 2 is schematic representation of a typical assembly using the apparatus of the present invention while running into the well prior to perforating.
Figure 3:
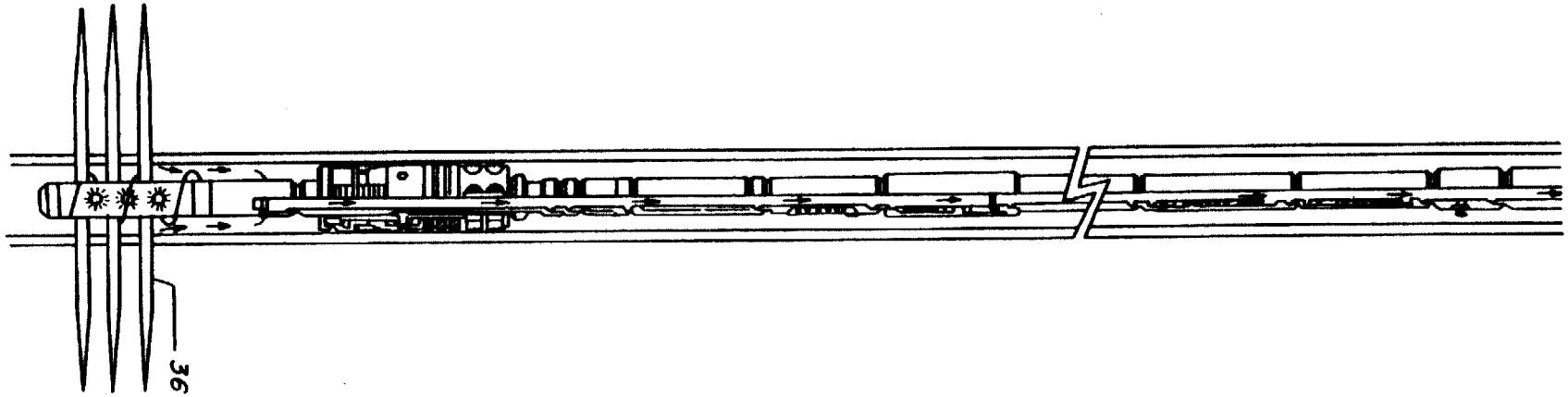
FIG. 3 shows the assembly in FIG. 2 and the flows that ensue immediately after perforation.

Some of the advantages of using the apparatus A of the present invention can be further appreciated by examination of FIGS. 2 and 3, which show a preferred embodiment of the tubing string above the gun 10. Drill collars 18 are located toward the bottom of the tubing string. Below the drill collars is an annular operated reversing valve (AORV) 20 which is reponsive to the pressure in the annulus 22 to allow flow from the annulus 22 into the tubing 24. Below the AORV 20 is a multi reverse circulating valve (MRCV) 26. Below the MRCV 26 are additional drill collar 28, followed by a pressure-operated test valve (POTV) 30. Below the POTV 30 are a recorder carrier, hydraulic jars, a rotational release safety joint, a crossover sub, and a retrievable packer 32. Below the packer is a ported disc assembly 34, which is followed by the mechanical firing head, then the perforating gun 10.

Figure 4:
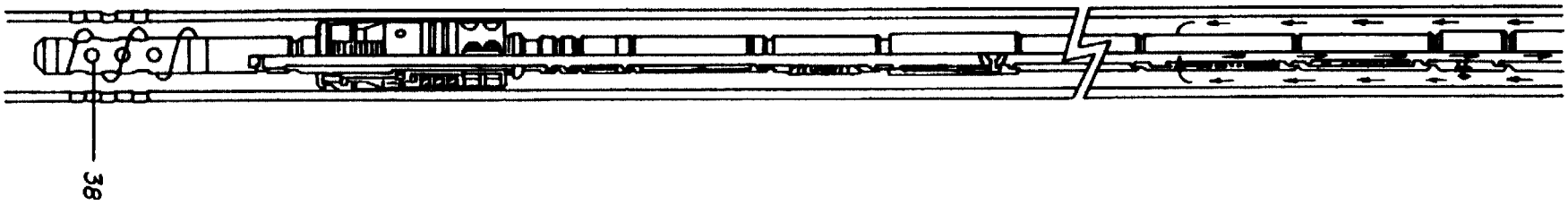
FIG. 4 is the view of FIG. 2 during killing the well by reversing out.

FIG. 2 shows the position of the components while running in the hole. The seals on the packer 32 are retracted. The POTV 30 is closed, as is the MRCV 26 and the AORV 20. Thereafter, an underbalance may be created using nitrogen followed by setting the packer 32 to seal off the annulus 22 from the formation to be perforated. The perforating gun 10 is fired. As shown in FIG. 3, upon firing of the gun 10 the formation begins to flow through the perforations 36 and/or the openings 38 if it is a cased hole (see FIG. 4). The formation begins to flow, bringing with it the debris generated by the functioning of gun 10. The flow is directed toward the ported disc 34, which is in fluid communication with the inside of the tubing 24. The flow up toward ported disc assembly 34 proceeds along the helix of auger 14, as shown by arrows 40 in FIG. 1. Thus, one of the advantages of the apparatus A of the present invention is illustrated in that the relatively narrow spiral path followed by the fluids produced from the formation increases their velocity and improves the ability of those fluids to carry with them the debris generated by the actuation of the gun 10. After the perforating and after allowing a sufficient time for the well to flow to remove debris to the surface, the perforations 36 can be isolated by using POTV 30 and putting it in a closed position. Thereafter, reverse circulating with kill fluid can proceed, as shown in FIG. 4, through the MRCV 26 to remove any debris and produced hydrocarbons from the tubing 24 as well as killing the well by flowing down through the annulus 22, through the MRCV 26 and up the tubing 24. Thereafter, sand can be spotted adjacent POTV 30 by pumping down the tubing 24 with a suitable carrier fluid, preferably a stimulating fluid, with the POTV 30 closed and the AORV 20 or the MRCV 26 open. In this manner, the sand can be spotted adjacent POTV 30 without introduction of any well-killing fluids into the formation. It should be appreciated that up until this time there has been no surface-applied pressure against the formation from the reversing out, nor have any of the chemicals normally associated with killing the well by the method of circulating or reversing out come in contact with perforations 36. When the charge of sand is located adjacent POTV 30, it is then opened, with AORV 20 and MRCV 26 closed. The carrier fluid for the sand is thus forced into the formation by being pushed through ported disc assembly 34 into perforations 36. The sand is deposited in perforations 36. The amount of sand to be pumped is determined from the amount of debris recovered, the volume of the well in the area surrounding the perforations, and an additional charge of approximately 25 percent to replace the volume taken up by the gun 10 after its removal. The stimulating fluid carrying the sand is pumped until an increase in pressure is observed at the surface, indicating that the sand has been sufficiently packed into the perforations 36, a situation commonly referred to as a "screen out." It should be noted that throughout this procedure, the packer 32 remains seated, sealing off the perforations 36 from the annulus 22.

Having appropriately placed the sand into the perforations 36, the gun 10 is withdrawn by applying an upward force to the tubing 24 after releasing the packer 32. The presence of the auger 14 facilitates the extraction of the gun 10. Instead of in the prior designs where the sand could compact around and on top of the gun 10, leaving a large surface area on gun 10 to adhere to the packed sand, the presence of the auger 14 creates numerous parallel shear lines around its outer periphery which can easily overcome the forces applied by the compacted sand to facilitate release of the gun 10 upon upward pulling of the tubing string 24. The pulling force on tubing string 24 must initially be high enough to overcome the weight of all the sand wedged between the flights of auger 14 and an additional incremental force to initiate the shearing action in the sand layer, thus initiating upward movement of the gun 10. It should be noted that rotation of the gun 10 is not necessary in a normal circumstance as the gun 10 should easily come out in view of the auger 14. However, the tubing string 24 can be rotated while it is being lifted to initiate rotation of gun 10 along with the lifting force. Due to the lefthand thread of auger 14, the righthand rotation of gun 10 imparts a loosening force or an unscrewing motion to the gun 10 to facilitate its upward movement in the well for ultimate removal at the surface. In an extreme case, the fasteners holding the core and auger 14 can be sheared off, allowing the core to drop off while the gun 10 is retrieved.

Having removed the gun 10 from the hole, a screen can be mounted to the bottom of the tubing string 24, which itself has an auger similar to that of auger 14. This screen is lowered into the compacted sand at the perforations 36 and, to the extent necessary, rotated into the compacted sand or simply lowered into the compacted sand by its own weight and the weight of the tubing string above it without any rotational force, depending upon the application. Of course, in these situations the packer 32 is once again connected to the tubing string directly above the gravel-pack screen, which is placed in the sand adjacent the perforations 36. Thereafter, normal production from the perforations 36 can begin through the screen.

In the preferred embodiment, the spacing of the flights on auger 14 is preferably approximately 4–8 inches.

One of the advantages of having the auger 14 on a core, which can be fastened to the gun 10 through fasteners engaging the gun 10 at opening 16, is that in the event a serious problem of sticking the gun 10 does arise, the tubing string 24 can be rotated to shear off the fasteners engaging the gun 10 at opening 16, facilitating removal of the gun 10 while leaving the auger 14, mounted to the core, in the hole for subsequent removal by a fishing operation. Alternatively, the core can be welded to the gun 10, without departing from the spirit of the invention.

The auger 14 continues above the openings 12 so that when the extra charge of sand is pumped down the tubing 24 and adjacent the perforations 36, the entire gun 10 that may be embedded in sand has the auger continuing on its outer face beyond perforations 36 so that the auger facilitates the removal operation.

Another advantage of auger 14 is it acts as a centralizer for the gun 10.

The auger 14 mounted on a core can be taken off one gun 10 and reused on another gun which has a similar pattern of openings 12. As to the gravel-pack screen which is inserted after the gun 10 is removed, the auger blades that would be on it have a righthand thread to facilitate the screwing in forces which can be imparted to the tubing 24 to get the screen to go into the packed sand.

The foregoing disclosure and description of the invention are illustrative and explanatory thereof, and various changes in the size, shape and materials, as well as in the details of the illustrated construction, may be made without departing from the spirit of the invention.

We claim:

1. A system for preparing a formation to allow hydrocarbons to be produced from a well comprising:

an elongated perforating gun;

means extending from the outer periphery of said gun, in a generally radial direction from its longitudinal axis, for facilitating extraction of said gun from the well, said means operable when said gun is covered with a solid material delivered into the well and lodged between the formation and said gun; and said means imparting a longitudinal extractive force when said gun is rotated along its longitudinal axis.

2. The system of claim 1, wherein said radially extending means extend around the periphery of said gun defining a continuous passage.

3. A system for preparing a formation to allow hydrocarbons to be produced from a well comprising:

an elongated perforating gun;

means extending from the outer periphery of said gun, in a generally radial direction from its longitudinal axis, for facilitating extraction of said gun from the well, said means operable when said gun is covered with a solid material delivered into the well and lodged between the formation and said gun;

said means imparting a longitudinal extractive force when said gun is rotated along its longitudinal axis;

said radially extending means extend around the periphery of said gun defining a continuous passage;

said extraction means further comprises:

a helix;

said gun further comprising at least one opening and at least one explosive charge selectively operable to exit from said opening when activated; and said helix displaced from said opening so as to be out of the path of said charge when it is selectively actuated to perforate the formation.

4. The apparatus of claim 3, further comprising:

a sleeve, said helix extending from said sleeve, said sleeve formed with at least one hole which comes into alignment with said opening on said gun when said sleeve is fitted over said gun.

5. The apparatus of claim 4, wherein said sleeve is removably mounted to said gun, thereby facilitating its reuse.

6. The apparatus of claim 3, further comprising:

a tubing string made of a plurality of threaded joints, said gun connected to the lower end thereof to allow raising and lowering of said gun in the well;

said helix being wound opposite hand to said threads forming said joints such that when said tubing is rotated in a direction so as to tighten said joints, said helix rotates in a direction to assist in extraction of said gun from any solid material tending to obstruct such removal.

7. The apparatus of claim 5, further comprising:

a tubing string made of a plurality of threaded joints, said gun connected to the lower end thereof to allow raising and lowering of said gun in the well;

said helix being wound opposite hand to said threads forming said joints such that when said tubing is rotated in a direction so as to tighten said joints, said helix rotates in a direction to assist in extraction of said gun from any solid material tending to obstruct such removal.

8. The apparatus of claim 7, further comprising:

a retrievable packer having a selectively retractable sealing means thereon for selectively sealing between perforations made by said gun and an annulus formed between said tubing and the well periphery;

said packer mounted to said tubing string above said gun and having at least one flow passage therethrough, said passage providing fluid communication between said tubing string and said gun;

first valve means in said tubing above said packer to allow selective flow communication between said passage in said packer and said tubing;

second valve means in said tubing above said first valve means to allow selective fluid communication between said tubing and said annulus;

a ported segment connected adjacent the opposite end of said packer from said first and second valve means to provide fluid communication from the formation into said tubing through said passage in said packer;

whereupon when said charge in said gun is fired, perforating the formation, causing dislodging of the formation and creating a flow of hydrocarbons and debris, the velocity of said hydrocarbons is increased by virtue of flow around said continuous passage created by said helix, thus facilitating removal of the debris from the well.

9. The apparatus of claim 8, wherein:

said first valve means is closed with said second valve means open to allow flushing of debris out of said tubing by reverse circulation down the annulus and up the tubing through said second valve means, in a manner so as not to put pressure on the newly perforated formation; whereupon without movement of said first and second valve means, a slurry comprising a liquid carrying a solid can be circulated down the tubing to spot said slurry adjacent the closed first valve means, whereupon with said second valve means closed and said first valve means open and said packer seals engaging the periphery of the wellbore, the slurry is squeezed through said passage in said packer into the formation, depositing the solids int he perforations and in the wellbore around said gun.

10. The apparatus of claim 3, wherein:

said helix is so disposed that when said charge is set off, resulting in perforating the formation and the creation of debris, the hydrocarbon flow from said formation follows said passage created by said helix with a resulting increase in the hydrocarbon velocity assisting in the efficient removal of the debris.

11. The apparatus of claim 3, wherein:

said helix creates a shear plane at its periphery such that on extraction of said gun with solids lodged between said gun and the perforations, the resistance to extraction is principally the weight of solids within said continuous passage and the shearing forces at the periphery of said helix.

*12. A perforating gun, comprising:*

*an elongated perforating gun, said gun having a body defining openings thereon through which explosive charges exit; and*

*means extending form said body of said gun, in a generally radial direction from its longitudinal axis, and extending generally longitudinally over a majority of said body in the area of said openings, for facilitating extraction of said gun from the well, said means for facilitating extraction operable when said gun is covered at least in part with a solid material delivered into the well and lodged between the formation and said gun, wherein said means for facilitating extraction creates at least one shear plane at its periphery to reduce the extractive force required to remove said gun.*

*13. The apparatus of claim 12, further comprising:*

*a tool string, said gun connected to the lower end thereof;*

*at least one packer connected to said tool string.*

*14. A perforating gun for perforating a formation, comprising:*

*an elongated perforating gun;*

*means extending from the outer periphery of said gun, in a generally radial direction from its longitudinal axis, for facilitating extraction of said gun from the well, said means for facilitating extraction operable when said gun is covered at least in part with a solid material delivered into the well and lodged between the formation and said gun, wherein said means for facilitating extraction creates at least one shear plane at its periphery to reduce the extractive force required to remove said gun;*

*said means for facilitating extraction, extending around the periphery of said gun defining a continuous passage;*

*said means for facilitating extraction, further comprising:*

*a helix;*

*said gun further comprising at least one opening and at least one explosive charge selectively operable to exit form said opening when activated; and*

*said helix displaced from said opening so as to be out of the path of said charge when it is selectively activated to perforate the formation.*

*15. The apparatus of claim 14, further comprising:*

*a tubing string made of a plurality of threaded joints, said gun connected to the lower end thereof to allow raising and lowering of said gun in the well;*

*said helix being wound opposite hand to said threads forming said joints such that when said tubing is rotated along its longitudinal axis in a direction so as to tighten said joints, said helix rotates in a direction to assist in extraction of said gun from any solid material tending to obstruct such removal.*

*16. The apparatus of claim 15, further comprising:*

*a retrievable packer having a selectively retractable sealing means thereon for selectively sealing between perforations made by said gun and an annulus formed between said tubing and the well periphery;*

*said packer mounted to said tubing string above said gun and having at least one flow passage therethrough, said passage providing fluid communication between said tubing string and said gun;*

*first valve means in said tubing above said packer to allow selective flow communication between said passage in said packer and said tubing;*

*second valve means in said tubing above said first valve means to allow selective fluid communication between said tubing and said annulus;*

*a ported segment connected adjacent the opposite end of said packer from said first and second valve means to provide fluid communication from the formation into said tubing through said passage in said packer;* whereupon when said charge in said gun is fired, perforating the formation, causing dislodging of the formation and creating a flow of hydrocarbons and debris, the velocity of said hydrocarbons is increased by virtue of flow around said continuous passage created by said helix, thus facilitating removal of the debris from the well.

*17. The apparatus of claim 14, wherein:*

*said helix is so disposed that when said charge is set off, resulting in perforating the formation and the creation of debris, the hydrocarbon flow from said formation follows said passage created by said helix with a resulting increase in the hydrocarbon velocity assisting in the efficient removal of the debris.*

*18. The apparatus of claim 14, wherein:*

*said helix creates a shear plane at its periphery such that on extraction of said gun with solids lodged between said gun and the perforations, the resistance to extraction is principally the weight of solids within said continuous passage and the shearing forces at the periphery of said helix.*

*19. The apparatus of claim 14, further comprising:*

*a tubing string made of a plurality of threaded joints, said gun connected to the lower end thereof;*

*at least one packer having a selectively retractable sealing means thereon for selectively sealing the annulus.*

*20. A method for preparing a formation to allow hydrocarbons to be produced from a well, comprising:*

*lowering a tool string into a well, wherein said tool string includes tubing, at least one packer, and at least one perforating gun, said gun having an elongated body defining openings thereon through which explosive changes exit and having a structure extending from said body and extending generally longitudinally over a majority of said body in the area of said openings, said structure extending in a generally radial direction from the longitudinal axis of said body, said structure operable when said gun is covered at least in part with a solid material delivered into the well and lodged between the formation and said gun, wherein the solid material creates a shear force on said structure and said structure creates at least one shear plane in the solid material;*

*positioning said perforating gun in the well adjacent the formation to be perforated;*

*setting said at least one packer to seal off the portion of the annulus containing the formation to be perforated;*

*firing said perforating gun;*

*releasing the packer;*

*overcoming the shear force on said structure extending from said gun; and*

*extracting said gun from the well.*

*21. The method of claim 20, further comprising:*

*removing the debris generated by firing said gun, wherein the step of removing the debris comprises the step of:* creating a flowpath for the hydrocarbons produced from the formation, which increases the hydrocarbon's velocity resulting in an increase in the hydrocarbon's capacity to suspend debris.

*22. A system for preparing a formation to allow hydrocarbons to be produced from a well, comprising:*

*an elongated perforating gun, said gun having a body defining openings thereon through which explosive charges exit; and*

*means extending form said body of said gun, in a generally radial direction from its longitudinal axis, and extending generally longitudinally over a majority of said body in the area of said openings, for facilitating extraction of said gun from the well, said means operable when said gun is covered at least in part with a solid material delivered into the well and lodged between the formation and said gun.*

*23. A system for preparing a formation to allow hydrocarbons to be produced from a well, comprising:*

*an elongated perforating gun;*

*means extending from the outer periphery of said gun, in a generally radial direction from its longitudinal axis, for facilitating extraction of said gun from the well, said means operable when said gun is covered at least in part with a solid material delivered into the well and lodged between the formation and said gun;*

*said means for facilitating extraction, extending around the periphery of said gun defining a continuous passage;*

*said means for facilitating extraction, further comprising:*

*a helix;*

*said gun further comprising at least one opening and at least one explosive charge selectively operable to exit from said opening when activated; and*

*said helix displaced from said opening so as to be out of the path of said charge when it is selectively activated to perforate the formation.*

*24. An apparatus for facilitating, at the surface of a wellbore, debris removal from fluids produced into a wellbore, comprising:*

*a perforating gun formed having an elongated body further having openings thereon through which explosive charges exit; and*

*means extending generally longitudinally over a majority of said body in the area of said openings creating a flowpath, the fluids produced into the wellbore passing through said flowpath and experiencing a velocity increase sufficient to entrain debris also in the wellbore with the fluids;*

*means connected to the wellbore at the surface for receiving the fluid with entrained debris after it passes through said flowpath.*

*25. The apparatus of claim 24, wherein said means on said body creating a flowpath comprises at least one helix.*

*26. The apparatus of claim 24, wherein said means on said body creating a flowpath comprises:*

*at least one extending member forming a tortuous path for the fluids produced into the well, to aid in entrainment of debris.*

*27. The apparatus of claim 26, further comprising:*

*means for positioning said elongated body at a predetermined depth in the wellbore.*

*28. The apparatus of claim 27, further comprising:*

*at least one packer;*

*said means for positioning said elongated body further comprises a tubing string.*

*29. A method of cleaning out a wellbore after perforating, comprising the steps of:*

*inserting in the well a perforating gun formed having an elongated housing having openings thereon through which explosive charges exit and having at least one extending member creating a flowpath, said at least one extending member extending generally longitudinally over a majority of the length of said body in the area of said openings;*

*allowing the formation to flow into the well;*

*increasing the velocity of the fluids flowing into the wellbore through said flowpath; entraining debris from the wellbore in the fluids from said velocity increase; removing the entrained debris from the wellbore.*

*30. The method of claim 29, further comprising:*

*creating a tortuous flowpath with said extending member.*

* * * * *